US009477931B2

(12) United States Patent
Park et al.

(10) Patent No.: US 9,477,931 B2
(45) Date of Patent: *Oct. 25, 2016

(54) SYSTEM FOR PREDICTING THICKNESS OF BATTERY AND METHOD FOR PREDICTING THICKNESS OF BATTERY

(71) Applicant: Samsung SDI Co., Ltd., Yongin-si, Gyeonggi-do (KR)

(72) Inventors: No-Kap Park, Yongin-si (KR); Ho-Yul Baek, Yongin-si (KR); Seung Bum Suh, Yongin-si (KR); Jeong-Soon Shin, Yongin-si (KR); Cheol-Ho Park, Yongin-si (KR); Hee-Kwan Chai, Yongin-si (KR); Young-Hwa Ko, Yongin-si (KR); Kyeong-Beom Cheong, Yongin-si (KR); Eun-Jung Lee, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 347 days.

This patent is subject to a terminal disclaimer.

(21) Appl. No.: 14/098,463

(22) Filed: Dec. 5, 2013

(65) Prior Publication Data

US 2014/0351177 A1    Nov. 27, 2014

(30) Foreign Application Priority Data

May 22, 2013  (KR) ......................... 10-2013-0057782

(51) Int. Cl.
*G06F 15/18* (2006.01)
*G06N 99/00* (2010.01)
*G06K 9/62* (2006.01)
*G06N 5/02* (2006.01)
*G06N 7/00* (2006.01)

(52) U.S. Cl.
CPC ............ *G06N 99/005* (2013.01); *G06K 9/6256* (2013.01); *G06K 9/6269* (2013.01); *G06N 5/025* (2013.01); *G06N 7/005* (2013.01)

(58) Field of Classification Search
None
See application file for complete search history.

(56) References Cited

U.S. PATENT DOCUMENTS

2011/0033735 A1    2/2011  Kinoshita et al.
2013/0268466 A1*   10/2013  Baek et al. .................... 706/12

FOREIGN PATENT DOCUMENTS

JP    2007-029765 A    2/2007
KR    10-2011-0008101 A    1/2011

* cited by examiner

*Primary Examiner* — Kakali Chaki
*Assistant Examiner* — Ababacar Seck
(74) *Attorney, Agent, or Firm* — Knobbe Martens Olson & Bear LLP

(57) ABSTRACT

A system for predicting the thickness of a battery is disclosed. In one aspect, the battery thickness predicting system includes a learning data input unit for receiving data on a previously manufactured battery. The thickness predicting system further includes an object data input unit for receiving data on a battery whose thickness is to be predicted. The system further comprises a mechanical learning unit connected to the learning data input unit to obtain a predicting function based on learning factors input to the learning data input unit and to provide weight values to the learning factors, respectively. The system further includes a thickness predicting unit connected to the object data input unit and the mechanical learning unit and using the weight values provided by the mechanical learning unit in order to predict the thickness of the battery whose thickness is to be predicted.

17 Claims, 6 Drawing Sheets

SYSTEM FOR PREDICTING THICKNESS OF BATTERY AND METHOD FOR PREDICTING THICKNESS OF BATTERY

RELATED APPLICATIONS

This application claims priority to and the benefit of Korean Patent Application No. 10-2013-0057782 filed in the Korean Intellectual Property Office on May 22, 2013, the entire contents of which are incorporated herein by reference.

BACKGROUND

1. Field

The described technology generally relates to a system for predicting the thickness of a battery and a method for predicting battery thickness.

2. Description of the Related Technology

Recently, due to development of an information technology (IT), various mobile devices such as a smart phone and a tablet PC are rapidly launched. Thicknesses of the mobile devices tend to be reduced in order to improve designs and convenience. In order to satisfy demands of customers, it is important to secure a degree of thickness precision of batteries.

SUMMARY OF CERTAIN INVENTIVE ASPECTS

One inventive aspect is a system for predicting the thickness of a battery before manufacturing the battery with improved reliability of prediction of the thickness of the battery.

Another aspect is a system for predicting the thickness of a battery which includes a learning data input unit for receiving data on a previously manufactured battery, an object data input unit for receiving data on a battery whose thickness is to be predicted, a mechanical learning unit connected to the learning data input unit to obtain a predicting function based on learning factors input to the learning data input unit and to provide weight values to the learning factors, respectively, and a thickness predicting unit connected to the object data input unit and the mechanical learning unit and using the weight values provided by the mechanical learning unit in order to predict a thickness of the battery whose thickness is to be predicted.

The learning factors may be obtained by actually measuring a thickness of the battery to be learned. The at least one learning factor may be selected from a group that includes learning design factors, learning process factors, and learning chemical factors.

The learning data input unit may receive at least one learning design factor and the learning design factor may represent a design variable of the battery to be learned.

The learning design factor related to a design element that constitutes the battery to be learned may be selected from a group that includes a capacity of the battery to be learned, an energy density, a capacity ratio between a positive electrode and a negative electrode, a height to width ratio of a cell, a thickness of the cell, a width of the cell, a thickness of a separator, a width of the separator, a pore characteristic of the separator, a thermal characteristic of the separator, film uniformity of the separator, presence of coating of the separator, the number of times of winding of the separator, adherence of the separator, a kind of a negative electrode active material, a mixture density of the negative electrode, a property value of the negative electrode, a thickness of the negative electrode, a loading level of the negative electrode, a kind of a positive electrode active material, a mixture density of the positive electrode, a property value of the positive electrode, a thickness of the positive electrode, a loading level of the positive electrode, an amount of electrolyte solution, a composition ratio of the electrolyte solution, a kind of an additive, a kind of a binder, an amount of the binder, properties of a positive electrode tab and a negative electrode tab, widths of the positive electrode tab and the negative electrode tab, a thickness of a pouch, and a thickness of an aluminum layer in the pouch.

The learning data input unit may receive at least one learning process factor and the learning process factor may represent a process variable used for manufacturing the battery to be learned.

The learning process factor related to process conditions under which parts of the battery to be learned are assembled with each other may be selected from a group consisting of an initial thickness, an evaluation thickness, an evaluation temperature, presence of evaluation acceleration, a charge rate C-Rate, a discharge rate C-Rate, a cut off charge voltage, a cut off charge current, a cut off discharge voltage, a cut off discharge current, a charge idle time, a discharge idle time, winding tension, a D/F condition, a time, a temperature, and a tab welding method.

The learning data input unit may receive at least one learning chemical factor and the learning chemical factor may represent a chemical variable of the battery to be learned after the battery to be learned is assembled.

The learning chemical factor related to process conditions under which the battery to be learned is made usable may be selected from a group that includes an aging temperature, an aging time, a degassing degree of vacuum, a degree of vacuum maintaining time, a sealing maintaining time, a thermal bonding pressure, a resealing bonding temperature, a releasing bonding time, a releasing bonding pressure, a releasing leaving temperature, a releasing leaving time, a cell pressing pressure, a cell pressing time, a pre-charging current, a pre-charging voltage, and a pre-charging time.

The at least one object factor may be selected from a group that includes object design factors, object process factors, and object chemical factors. The mechanical learning unit may include a plurality of sub-mechanical learning units and the thickness predicting unit may include a plurality of sub-thickness predicting units corresponding to the plurality of sub-mechanical learning units.

Each of the sub-mechanical learning units may obtain a predicting function based on a corresponding learning factor and provides a weight value and the learning factor may be selected from a group that includes learning design factors, learning process factors, and learning chemical factors.

The sub-mechanical learning unit may receive a predicting function of a neighboring sub-mechanical learning unit as an input. The sub-thickness predicting unit may execute a predicting function using a weight value provided by a corresponding sub-mechanical learning unit.

The battery thickness predicting system may further include a thickness display unit connected to the thickness predicting unit to display a predicted thickness of the object battery based on the one or more predicting characteristics.

Another aspect is a method of predicting the thickness of a battery which includes extracting data on a previously manufactured battery from a data base in which the data on the previously manufactured battery is stored, dividing the extracted data into learning data and valid data, providing a weight value to the learning data, and obtaining a predicting function from the learning data and the weight value, verifying the predicting function using the valid data, and predicting a thickness of a battery using data on a battery whose thickness is to be predicted, the predicting function, and the weight value. Another aspect is a system for predicting the thickness of a battery, comprising: a learning data input unit configured to receive a plurality of learning factors on a first battery, wherein the first battery is a previously manufactured battery; an object data input unit configured to receive at least one object factor on a second battery whose thickness is to be predicted; a mechanical learning unit connected to the learning data input unit, wherein the mechanical learning unit is configured to obtain a predicting function based at least in part on the learning factors and to respectively provide a plurality of weight values to the learning factors; and a thickness predicting unit connected to the object data input unit and the mechanical learning unit, wherein the thickness predicting unit is configured to predict the thickness of the second battery based at least in part on the weight values.

In the above system, the learning data input unit is configured to obtain the learning factors based at least in part on an actual measurement of the thickness of the first battery. In the above system, the learning factors comprise at least one of the following: learning design factors, learning process factors, and learning chemical factors. In the above system, the learning data input unit is configured to receive at least one learning design factor, and wherein the learning design factor represents a design variable of the first battery.

In the above system, the learning design factor related to a design element that constitutes the first battery comprises at least one of the following: a capacity of the first battery, an energy density, a capacity ratio between a positive electrode and a negative electrode, a height to width ratio of a cell, the thickness of the cell, the width of the cell, the thickness of a separator, the width of the separator, a pore characteristic of the separator, a thermal characteristic of the separator, film uniformity of the separator, presence of coating of the separator, the number of times of winding of the separator, adherence of the separator, a kind of a negative electrode active material, a mixture density of the negative electrode, a property value of the negative electrode, the thickness of the negative electrode, a loading level of the negative electrode, a kind of a positive electrode active material, a mixture density of the positive electrode, a property value of the positive electrode, the thickness of the positive electrode, a loading level of the positive electrode, an amount of electrolyte solution, a composition ratio of the electrolyte solution, a kind of an additive, a kind of a binder, an amount of the binder, properties of a positive electrode tab and a negative electrode tab, the widths of the positive electrode tab and the negative electrode tab, the thickness of a pouch, and the thickness of an aluminum layer in the pouch.

In the above system, the learning data input unit is configured to receive at least one learning process factor, and wherein the learning process factor represents a process variable used for manufacturing the first battery. In the above system, the learning process factor related to process conditions under which parts of the first battery are assembled with each other comprises at least one of the following: an initial thickness, an evaluation thickness, an evaluation temperature, presence of evaluation acceleration, a charge rate (C-Rate), a discharge rate (C-Rate), a cut off charge voltage, a cut off charge current, a cut off discharge voltage, a cut off discharge current, a charge idle time, a discharge idle time, winding tension, a degassing/folding (D/F) condition, a time, a temperature, and a tab welding method.

In the above system, the learning data input unit is configured to receive at least one learning chemical factor, and wherein the learning chemical factor represents a chemical variable of the first battery after the first battery is assembled. In the above system, the learning chemical factor related to process conditions under which the first battery is made usable comprises at least one of the following: an aging temperature, an aging time, a degassing degree of vacuum, a degree of vacuum maintaining time, a sealing maintaining time, a thermal bonding pressure, a resealing bonding temperature, a releasing bonding time, a releasing bonding pressure, a releasing leaving temperature, a releasing leaving time, a cell pressing pressure, a cell pressing time, a pre-charging current, a pre-charging voltage, and a pre-charging time.

In the above system, the object factor comprises at least one of the following: object design factors, object process factors, and object chemical factors. In the above system, the mechanical learning unit comprises a plurality of sub-mechanical learning units, and wherein the thickness predicting unit comprises a plurality of sub-thickness predicting units respectively corresponding to the sub-mechanical learning units.

In the above system, each of the sub-mechanical learning units is configured to obtain a predicting function based at least in part on a corresponding learning factor and provide a weight value, and wherein the learning factor comprises at least one of the following: learning design factors, learning process factors, and learning chemical factors. In the above system, the sub-mechanical learning unit is configured to receive a predicting function of a neighboring sub-mechanical learning unit as an input. In the above system, the sub-thickness predicting unit is configured to execute a predicting function based at least in part on a weight value received from a corresponding sub-mechanical learning unit.

Another aspect is a method of predicting the thickness of a battery, comprising: extracting data on a first battery from a memory, wherein the first battery is a previously manufactured battery; dividing the extracted data into learning data and valid data; providing a weight value to the learning data; obtaining a predicting function from the learning data and the weight value; verifying the predicting function based at least in part on the valid data; and predicting the thickness of a second battery based at least in part on the predicting function and the weight value.

In the above method, the learning data is obtained from an actual measurement of the thickness of the first battery. In the above method, the learning data comprises at least one of the following: learning design factors, learning process factors, and learning chemical factors.

Another aspect is a system for predicting the thickness of a battery, comprising: a learning data receiver configured to receive at least one learning factor on a first battery; an object data receiver configured to receive at least one object factor on a second battery whose thickness is to be predicted; a mechanical learning unit being in data communication with the learning data receiver, wherein the mechanical learning unit is configured to obtain a predicting function based at least in part on the learning factor and to respectively provide at least one weight value to the learning factor; and a thickness predictor being in data communication with the object data receiver and the mechanical learning unit and configured to predict the thickness of the second battery based at least in part on the weight value.

In the above system, the learning data receiver is configured to receive at least one learning design factor, and wherein the learning design factor represents a design variable of the first battery. In the above system, the object factor comprises at least one of the following: object design factors, object process factors, and object chemical factors.

DETAILED DESCRIPTION OF CERTAIN ILLUSTRATIVE EMBODIMENTS

In a case of a lithium secondary battery, with repeated charge and discharge cycles, the battery expands. This is because a lithium compound is generated in the battery so that a solid electrolyte interfacial (SEI) layer is grown. In order to manufacture a mobile device to be thin, an increase in the battery thickness should be determined and the thickness of the battery should be reflected in the design of the mobile device. If a battery thickens beyond the tolerances for the mobile device, the device could malfunction. In addition, to the contrary, when the limit to the size of the mobile device is set to be excessively larger than the increase in the thickness of the battery, the mobile device may not be manufactured to be thin.

However, it takes significantly long to estimate a maximum increase in the thickness of the battery. When information on a specification of a battery is received from a customer, it generally takes about 60 days to design the battery and about 90 days to manufacture the battery. To test the battery manufactured sample is put into a charge and discharge apparatus to charge and discharge for hundreds of cycles. Then the thickness of the sample is verified whether a maximum increase in the thickness of the sample satisfies the specification requested by the customer. When charge and discharge are repeated in four cycles a day, it can take about five months after manufacturing the sample to determine thickness of a battery. When the testing shows that a battery does not meet the specifications, it is redesigned and retested. This redesigning and testing can make it difficult to meet deadlines.

Figure 1:
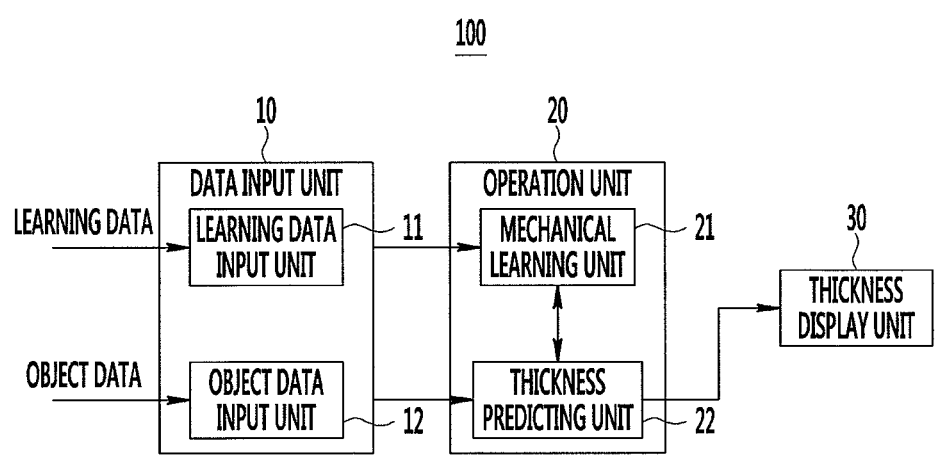
FIG. 1 is a block diagram schematically illustrating a structure of a battery thickness predicting system according to an exemplary embodiment.

FIG. 1 is a block diagram schematically illustrating a structure of a battery thickness predicting system 100 according to an exemplary embodiment. Depending on the embodiment, certain elements may be removed from or additional elements may be added to the system 100 illustrated in FIG. 1. Furthermore, two or more elements may be combined into a single element, or a single element may be realized as multiple elements. Referring to FIG. 1, a battery thickness predicting system 100 includes a data input unit 10, an operation unit 20, and a thickness display unit 30.

The data input unit 10 is an interface that receives various data items for a learning operation and a thickness predicting operation of the operation unit 20. The data input unit 10 includes a learning data input unit 11 and an object data input unit 12.

The learning data input unit 11 may receive data items (hereinafter, referred to as learning data) on a battery (hereinafter, a battery to be learned or a first battery). For example, the learning data input unit 11 provides a user interface including a standardized template capable of designating a medium file on a computer recorded in accordance with a previously defined protocol or directly writing learning data to receive the learning data. In some embodiments, the learning data includes factors that may affect determination of the thickness of a battery. The operation unit 20 may be learned by the factors. In some embodiments, at least one of the data input unit 10 and the operation unit 20 is implemented by one or more processors and memories. In various embodiments, the processor is configured as, for example, i) an advanced RISC machine (ARM) microcontroller and ii) Intel Corporation's microprocessors (e.g., the Pentium family microprocessors). In one embodiment, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 7/Vista/2000/9x/ME/XP, Macintosh OS, OS/2, Android, iOS and the like. The learning data may include design characteristic factors, process characteristic factors, chemical characteristic factors, and measurement characteristic factors by cycles for a battery to be learned. The design characteristic factors, the process characteristic factors, the chemical characteristic factors, and the measurement characteristic factors by cycles may be numerically represented.

The design characteristic factors related to a design element that constitutes the battery to be learned may include a capacity of a cell to be learned, an energy density, a capacity ratio between a positive electrode and a negative electrode, a height to width ratio of the cell, the thickness of the cell, the width of the cell, the thickness of a separator, the width of the separator, a pore characteristic of the separator, a thermal characteristic of the separator, film uniformity of the separator, presence of coating of the separator, the number of times of winding of the separator, adherence of the separator, a kind of a negative electrode active material, a mixture density of the negative electrode, a property value of the negative electrode, the thickness of the negative electrode, a loading level of the negative electrode, a kind of a positive electrode active material, a mixture density of the positive electrode, a property value of the positive electrode, the thickness of the positive electrode, a loading level of the positive electrode, an amount of electrolyte solution, a composition ratio of the electrolyte solution, a kind of an additive, a kind of a binder, an amount of the binder, properties of a positive electrode tab and a negative electrode tab, the widths of the positive electrode tab and the negative electrode tab, the thickness of a pouch, and the thickness of an aluminum layer in the pouch.

The mixture density means a mass of the active material of the positive electrode or the negative electrode that exists per a cubic centimeter (CC) of a cell and has a unit of g/cc. An electrode plate means that the active material is coated on a current collector and the thickness of the electrode plate means the combined thicknesses of the current collector and the active material. The loading level means an amount of the active material per a unit area coated on the electrode plate and has a unit of mg/cm$^2$. Coating of the separator means that a surface of the separator is coated with a coating material in order to improve thermal, electrical, and mechanical safety of the separator and the coating material includes non-woven fabric and an inorganic material (e.g., ceramic). Adherence between the electrode plate and the separator means adherence between a positive electrode plate or a negative electrode plate coated with the active material and the separator and particularly means adherence between the active material and the separator. A property value of the active material and a property value of a binder material may include electric conductivity, ion conductivity, porosity, relative permittivity, diffusion coefficients, and crystal structures of the materials.

The design characteristic factors are not necessarily limited to the above-described factors but may include all of the design characteristic factors that may affect the thickness of a battery. In some embodiments, the design characteristic factors are not data obtained by measurement but are numerical values required for manufacturing a battery having a specific specification and are data that may be grasped before manufacturing the battery.

The process characteristic factors related to process conditions under which parts (e.g., the positive electrode plate, the negative electrode plate, and the separator) that constitute a cell to be learned are assembled with each other may include an initial thickness, an evaluation thickness, an evaluation temperature, presence of evaluation acceleration, a charge rate (C-Rate), a discharge rate (C-Rate), a cut off charge voltage, a cut off charge current, a cut off discharge voltage, a cut off discharge current, a charge idle time, a discharge idle time, winding tension, a D/F condition, a time, a temperature, and a tab welding method.

Here, the D/F condition means temperature, pressure, and time conditions in a degassing process and a folding process, respectively. The degassing process means a process of removing a gas in the pouch. The cut off voltage and current mean a voltage of determining that charge and discharge are completed.

The process characteristic factors are not necessarily limited to the above-described factors but may include all of the process characteristic factors that may affect the thickness of the battery.

The chemical characteristic factors related to process conditions under which an assembled cell to be learned is made usable before the cell is actually used may include an aging temperature, an aging time, a degassing degree of vacuum, a degree of vacuum maintaining time, a sealing maintaining time, a thermal bonding pressure, a resealing bonding temperature, a releasing bonding time, a releasing bonding pressure, a releasing leaving temperature, a releasing leaving time, a cell pressing pressure, a cell pressing time, a pre-charging current, a pre-charging voltage, and a pre-charging time.

The chemical characteristic factors are not necessarily limited to the above-described factors but may include all of the chemical characteristic factors that may affect the thickness of the battery.

The measurement characteristic factors by cycles are values to be predicted, that is, values that may represent the thickness of a cell may include a thickness in accordance with the number of times of charge and discharge, an increase in thickness, the maximum thickness, and a thickness ratio among an upper part, an intermediate part, and a lower part.

All of the factors for the cell to be learned may be input to the learning data input unit 11 but are not necessarily input to the learning data input unit 11. In some embodiments, the measurement characteristic factors by cycles that represent the thickness of the cell to be learned are input in order to learn a relationship between the other factors and the thickness of the cell. The design characteristic factors can affect the thickness of the battery more than the process characteristic factors and the chemical characteristic factors. Therefore, it is efficient to input a set of at least the design characteristic factors and the measurement characteristic factors by cycles as a learning data item to the learning data input unit 11. In some embodiments, although learning of the process characteristic factors or the chemical characteristic factors is omitted, the omission does not significantly affect a learning result.

The object data input unit 12 may receive data (hereinafter, referred to as object data) on a battery whose thickness is to be predicted. For example, the object data input unit 12 designates a file on a computer recorded in accordance with a previously defined protocol or provides a user interface including a standardized template capable of directly writing the object data to receive the object data. The object data is used for the learned operation unit 20 to predict the thickness of the battery.

The object data may include design characteristic factors, process characteristic factors, and chemical characteristic factors for a battery (hereinafter, referred to as a cell or a battery to be predicted or a second battery) whose thickness is to be predicted. The design characteristic factors, the process characteristic factors, and the chemical characteristic factors may be numerically represented. Here, the measurement characteristic factors by cycles as the object data are not input to the object data input unit 12.

The design characteristic factors related to a design element that constitutes the battery to be predicted may include a capacity of a cell to be predicted, an energy density, a capacity ratio between a positive electrode and a negative electrode, a height to width ratio of the cell, the thickness of the battery, a width of the battery, the thickness of a separator, the width of the separator, a pore characteristic of the separator, a thermal characteristic of the separator, film uniformity of the separator, presence of coating of the separator, the number of times of winding of the separator, adherence of the separator, a kind of a negative electrode active material, a mixture density of the negative electrode, a property value of the negative electrode, the thickness of the negative electrode, a loading level of the negative electrode, a kind of a positive electrode active material, a mixture density of the positive electrode, a property value of the positive electrode, the thickness of the positive electrode, a loading level of the positive electrode, an amount of electrolyte solution, a composition ratio of the electrolyte solution, a kind of an additive, an amount of the additive, a composition ratio of the additive, a kind of a binder, an amount of the binder, properties of a positive electrode tab and a negative electrode tab, the widths of the positive electrode tab and the negative electrode tab, the thickness of a pouch, and the thickness of an aluminum layer in the pouch.

The design characteristic factors are not necessarily limited to the above-described factors but may include all of the design characteristic factors that may affect the thickness of the battery.

The design characteristic factors are not data obtained by measurement but are characteristics to which physical and chemical characteristics provided in manufacturing a battery having a specific specification and are data that may be determined before manufacturing the battery. According to the present embodiment, it is not necessary to spend an additional time on obtaining input values for predicting the thickness of the battery. Since the thickness of the battery is predicted by the input values to which the physical and chemical characteristics are reflected, it is possible to increase reliability of the predicted thickness.

The process characteristic factors related to process conditions under which parts (e.g., the positive electrode plate, the negative electrode plate, and the separator) that constitute a cell to be predicted are assembled with each other may include an initial thickness, an evaluation thickness, an evaluation temperature condition, presence of evaluation acceleration, a charge rate C-Rate, a discharge rate C-Rate, a cut off charge voltage, a cut off charge current, a cut off discharge voltage, a cut off discharge current, a charge idle time, a discharge idle time, winding tension, a D/F condition, a pre-curing time, a pre-curing temperature, and a horizontality to verticality ratio. The process characteristic factors are not necessarily limited to the above-described factors but may include all of the process characteristic factors that may affect the thickness of the battery.

The chemical characteristic factors related to process conditions under which an assembled cell to be predicted is made usable before the cell is actually used may include an aging temperature, an aging time, a degassing degree of vacuum, a degree of vacuum maintaining time, a sealing maintaining time, a thermal bonding pressure, a resealing bonding temperature, a releasing bonding time, a releasing bonding pressure, a releasing leaving temperature, a releasing leaving time, a cell pressing pressure, a cell pressing time, a pre-charging current, a pre-charging voltage, a pre-charging time, a pre-curing temperature, a pre-curing time, a curing temperature, a curing time, and a cut off method. The chemical characteristic factors are not necessarily limited to the above-described factors but may include all of the chemical characteristic factors that may affect the thickness of the battery.

In some embodiments, all of the factors for the cell to be predicted are not necessarily input to the object data input unit 12 but at least only the design characteristic factors as the object data may be input to the object data input unit 12 to predict the thickness of the battery. All of the factors included in the design characteristic factors may not be necessarily selected as the object data but only partial factors may be selected to be input to the object data input unit 12.

The operation unit 20 may include a mechanical learning unit 21 and a thickness predicting unit 22.

The mechanical learning unit 21 performs mechanical learning on the factors input through the learning data input unit 11 to operate predicting functions and to provide weight values to the factors, respectively. For example, when it is assumed that mechanical learning is performed on the kind of the positive electrode active material and thicknesses of the cell by cycles as the learning data, the mechanical learning unit 21 may obtain a predicting function that represents a relationship between the kind of the positive electrode active material and the thicknesses of the cell by cycles to provide a weight value to a factor of the kind of the positive electrode active material in accordance with an influence that the kind of the positive electrode active material has on the thickness of the cell. As a result, the mechanical learning unit 21 provides weight values in accordance with influences that design characteristic factors, process characteristic factors, and chemical characteristic factors for an arbitrary battery have on the thickness of a cell by cycles and operates predicting functions to learn characteristics of the thickness of the cell. Such a mechanical learning process may be performed on all of the learning data input to the learning data input unit 11 and a learning result may be stored by an additional storage medium (not shown).

In addition, the thickness predicting system may further include a data extracting unit. The data extracting unit accesses a database in which the data items input through the input unit are stored to extract data on a cell having a similar specification to that of the cell to be predicted. The extracting unit transmits the extracted data to the mechanical learning unit.

Figure 2:
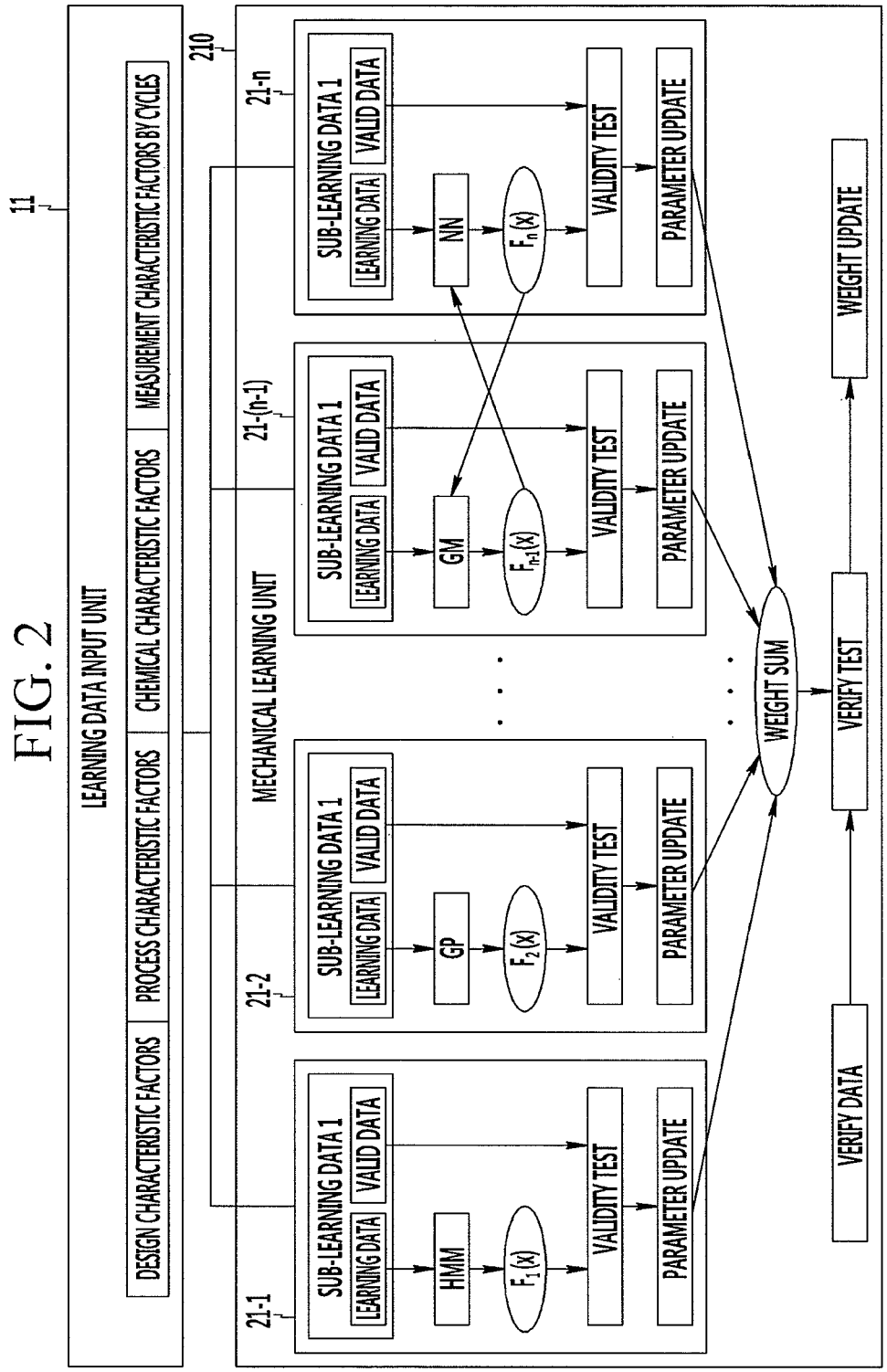
FIG. 2 is a block diagram illustrating a structure of the mechanical learning unit illustrated in FIG. 1 in detail.

FIG. 2 is a block diagram illustrating the mechanical learning unit 21 illustrated in FIG. 1 in detail.

Referring to FIG. 2, the mechanical learning unit 21 may include a plurality of sub-mechanical learning units 21-1, 21-2, . . . , 21-(n-1) and 21-n. The same number of arbitrary data items may be input to each of the sub-mechanical learning units 21-1, 21-2, . . . , 21-(n-1) and 21-n regardless of the factor group defined by the learning data input unit 11. The measurement characteristic factors can be measured for each cycle. For example, when the number of learning data sets input to each of the sub-mechanical learning units 21-1, 21-2, . . . , 21-(n-1) and 21-n is 25, 20 first learning data sets and 5 second learning data sets may be input to the first sub-mechanical learning unit 21-2. Here, the first learning data sets may use the design characteristic factors and the measurement characteristic factors by cycles as a basic unit and the second learning data sets may use the process characteristic factors and the measurement characteristic factors by cycles as a basic unit. Simultaneously, the 15 first learning data sets, the 5 second learning data sets, and 5 third learning data sets may be input to the second sub-mechanical learning unit 21-2. Here, the third learning data sets may use the chemical characteristic factors and the measurement characteristic factors by cycles as a basic unit.

The respective sub-mechanical learning units may use various learning techniques. The learning techniques may include hidden Markov models, genetic programming, Gaussian mixture models, and neural network models.

For example, the first sub-mechanical learning unit 21-1 may use the hidden Markov models, the second sub-mechanical learning unit 21-2 may use the genetic programming, the (n-1)th sub-mechanical learning unit 21-(n-1) may use the Gaussian mixture models, and the nth sub-mechanical learning unit 21-n may use the neural network models.

The hidden Markov models are doubly stochastic processing models, in which it is assumed that a probability of observing an event at a certain time is dependent on an observing result at a previous time and an unobservable state is estimated as an observable state.

The genetic programming based on a genetic algorithm evolves a dynamic tree structure decoded as a program, considers a number of variables when there is no ideal answer, and extracts the most efficient value through a compromise.

The Gaussian mixture models are a technique of modeling a distribution of data using a Gaussian probability density function. The neural network models are a technique of finding out a pattern inherent in data through repetitive learning processes and generalizing the pattern to find out useful information required for decision making from large capacity data.

The sub-mechanical learning units 21-1, 21-2, . . . , 21-($n$–1) and 21-$n$ have the same structure and process mechanical learning of learning data in parallel. Therefore, hereinafter, a structure of the mechanical learning unit 21 will be described with reference to a structure of the first sub-mechanical learning unit 21-1.

The first sub-mechanical learning unit 21-1 may divide the sub-learning data received from the learning data input unit 11 into learning data and valid data. Here, the learning data is to be actually learned by the first sub-mechanical learning unit 21-1 and the valid data is for testing whether a result learned through the learning data is valid. A ratio between the number of learning data items and the number of valid data items may be previously set or may be randomly set. For example, the ratio between the number of learning data items and the number of valid data items may be previously set as 8:2 or 7:3 or may be set in accordance with quantities or qualities of the respective data items.

The first sub-mechanical learning unit 21-1 may separately learn the learning data divided by the sub-learning data using the hidden Markov models to provide weight values to the respective factors.

As described above, it is assumed that, in one learning data, one of the design characteristic factors, the process characteristic factors, and the chemical characteristic factors and the measurement characteristic factors by cycles form a set. Hereinafter, for convenience sake, it is assumed that one learning data includes the design characteristic factors and the measurement characteristic factors by cycles.

The hidden Markov models may calculate a relationship between the design characteristic factors and the measurement characteristic factors (i.e., the thickness of the cell) by cycles and the relationship may be expressed by a predicting function. In addition, calculation of an influence that the design characteristic factors have on the thickness of the cell may be performed by the hidden Markov models providing weight values to the design characteristic factors.

The first sub-mechanical learning unit 21-1 obtains a predicting function having the design characteristic factors and the weight values as parameters through the hidden Markov models to test validity of the learned result using the valid data.

The valid data also includes one of the design characteristic factors, the process characteristic factors, and the chemical characteristic factors and the measurement characteristic factors by cycles like the learning data. In some embodiments, the valid data is formed of, for example, only a result of an input of the design characteristic factors and an input of the measurement characteristic factors by cycles. Therefore, it may be determined by the valid data whether the result learned by the learning data is valid.

For example, it is assumed that there are three learning data items of {X1, Y1}, {X2, Y2}, and {X3, Y3} and there is one valid of {X', Y'}. Here, X1, X2, and X3 mean values of the design characteristic factors, the process characteristic factors, or the chemical characteristic factors and Y1, Y2, and Y3 mean the measurement characteristic factors by cycles for X1, X2, and X3, that is, capacities of a cell. In addition, it is assumed that weight values of {W1, W2, W3} for {X1, X2, X3} are calculated in the learned result.

First, a value most approximate to X' of the valid data is found out among the learning data items {X1, X2, X3}. There are various methods of finding out an approximate value. According to the present embodiment, a least mean square method defined by the following equation 1 may be used.

$$\min \sum_{k=1}^{3} (X_k - X')^2 \qquad (1)$$

After the process of the equation 1, for example, when X2 is determined as a value most approximate to X', it may be determined by the corresponding weight value W2 of X2 whether a learned result of X2 is valid. That is, the weight value W2 of X2 and X' are input to a corresponding predicting function and the result value is compared with Y' to determine reliability of the learned result of X2. Here, Y' may be a capacity of a cell for the factor of X' and is a value predetermined in accordance with X'. As described above, a validity test is a process of determining correctness of a value output by the predicting function obtained by the learning process for a new input value similar to the learning data.

On the other hand, the result value obtained by inputting W2 and X' to the corresponding predicting function is compared with Y' and, when a difference between the result value and Y' is larger than a reference value (when an error is larger than a reference value), learning of X2 is repeated to perform a work of finding out a weight value and, when the difference between the result value and Y' is smaller than the reference value (when the error is smaller than the reference value), data included in the valid data is classified as new learning data to perform the above-described learning process. As a result, a process of updating the parameters of the predicting function, that is, the learning data and the weight value may be performed.

The other sub-mechanical learning units 21-1, 21-2, . . . , 21-($n$–1) and 21-$n$ excluding the first sub-mechanical learning unit 21-1 may learn the learning data provided thereto by the above-described method and may provide weight values W2, . . . Wn–1, and Wn by factors.

When learning of the mechanical learning unit 21 is completed, predicting functions F1($x$), F2($x$) . . . Fn–1($x$), and Fn($x$) are determined and the learned result may be stored in an additional storage medium (not shown). The learned result may be a weight value set and may be represented in a predetermined matrix. For example, the weight value set may be represented in a matrix of M×N by the following equation 2.

$$\begin{Bmatrix} W_{11} & W_{12} & \ldots & W_{1n-1} & W_{1n} \\ W_{21} & W_{22} & \ldots & W_{2n-1} & W_{2n} \\ & & \vdots & & \\ W_{m1} & W_{m2} & \ldots & W_{mn-1} & W_{mn} \end{Bmatrix} \qquad (2)$$

In addition, a factor matrix corresponding to the weight value matrix of the equation 2 may be represented by the following equation 3.

$$\begin{Bmatrix} X_{11} & X_{12} & \ldots & X_{1n-1} & X_{1n} \\ X_{21} & X_{22} & \ldots & X_{2n-1} & X_{2n} \\ & & \vdots & & \\ X_{m1} & X_{m2} & \ldots & X_{mn-1} & X_{mn} \end{Bmatrix} \qquad (3)$$

Referring to the equations 2 and 3, it is noted through mechanical learning that the weight values corresponding to the respective factors exist. For example, a weight value of a factor of X22 is $W_{22}$ and a weight value of a factor of Xmn−1 is Wmn−1.

On the other hand, a sigmoid function may be used as an example of the predicting function F(x) and may be defined by the following equation 4.

$$F(x) = \frac{1}{1+e^{-Y}} \quad (4)$$

In the equation 4, Y means the sum of multiplications of the factor values and the weight values and may be defined by the following equation 5.

$$Y = \sum_{k=1, i=1}^{m,n} X_{ki} \cdot W_{ki} \quad (5)$$

Therefore, the mechanical learning unit 21 provides the weight values in accordance with the influences that the design characteristic factors, the process characteristic factors, and the chemical characteristic factors have on changes in the thicknesses of the cell by cycles to operate the predicting function defined by the equation 4. Here, the predicting function represents a relationship among the design characteristic factors, the process characteristic factors, and the chemical characteristic factors and the changes in the thicknesses of the cell by cycles. An output value of the predicting function may vary with the factor values and the weight values.

Figure 3:
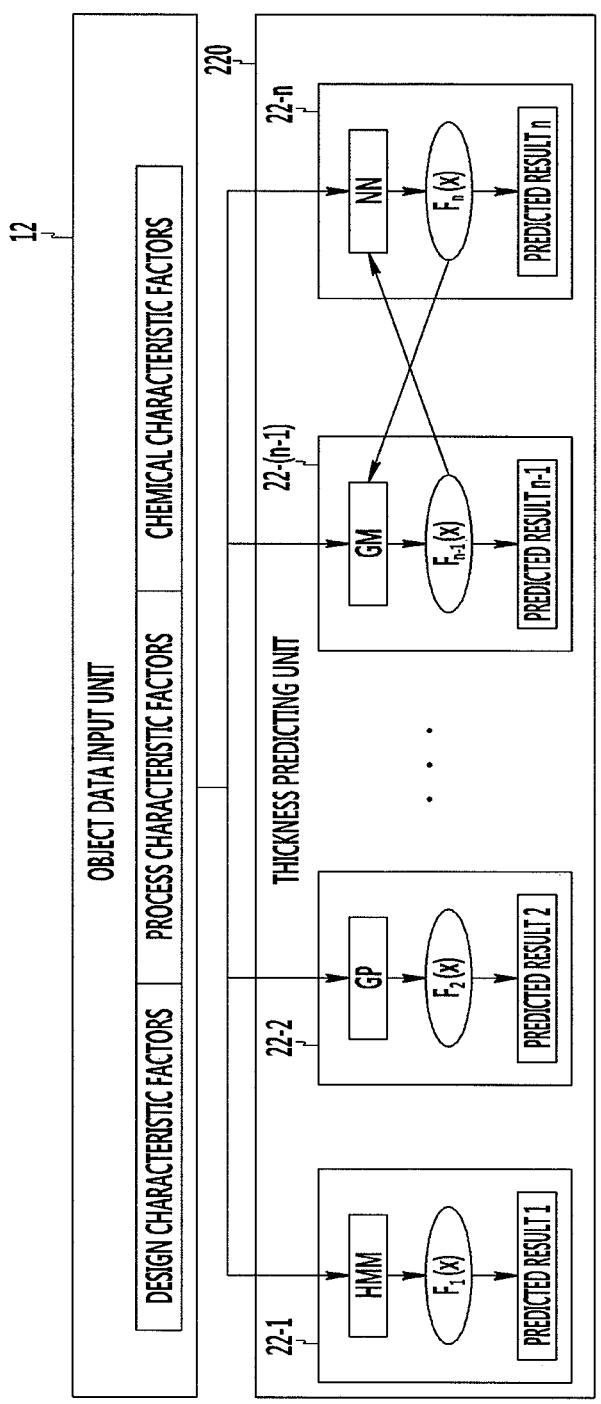
FIG. 3 is a block diagram illustrating a structure of the thickness predicting unit illustrated in FIG. 1 in detail.

In addition, one of the sub mechanical learning units may receive a predicting function of another sub-mechanical learning unit as an input. That is, as illustrated in FIG. 3, the sub-mechanical learning unit 21-(n−1) receives a result of a predicting function of the sub-mechanical learning unit 21-n as an input and the sub-mechanical learning unit 21-n receives a result of a predicting function of the sub-mechanical learning unit 21-(n−1) as an input. Therefore, the respective sub-mechanical learning units may hierarchically generate predicted results.

As described above, learning modules may separately or hierarchically generate predicted results. However, since it is difficult for one learning module to output a good predicted result for all of the inputs, a final result can be obtained with reference to results of a number of learning modules. For example, weight values obtained by the respective learning modules are averaged to be used or, after the learning modules separately perform learning, a weight value obtained by a module whose performance is highest in a validity test may be used.

The thickness predicting unit 22 may predict the thicknesses of the object cell by cycles from the factors received from the object data input unit 12 using the predicting functions F1(x), F2(x), ... Fn−1(x), and Fn(x) and the weight values W1, W2 ... Wn−1, and Wn obtained by the mechanical learning unit 21.

FIG. 3 is a block diagram illustrating a structure of the thickness predicting unit 22 illustrated in FIG. 1 in detail.

As illustrated in FIG. 3, the thickness predicting unit 22 may include a plurality of sub-thickness predicting units 21-1, 21-2, ..., 21-(n−1) and 21-n. The respective factors may be input to the sub-thickness predicting units 21-1, 21-2, ..., 21-(n−1) and 21-n regardless of the factor group defined by the object data input unit 12. For example, when it is assumed that three design characteristic factors such as a property value of an active material, an amount of electrolyte solution, and an amount of an additive as object data are input, the three factors may be input to the three sub-thickness predicting units, respectively.

Each of the sub-thickness predicting units 21-1, 21-2, ..., 21-(n−1) and 21-n finds out the most approximate learning factor to an object factor among learning factors stored in an additional storage medium (not shown) using the hidden Markov models, the genetic programming, the Gaussian mixture models, and the neural network models.

For example, when it is assumed that the learning factors stored in the additional storage medium (not shown) are {X1, X2, X3 ... Xn−1, and Xn} and the object factor received from the object data input unit 12 is Xi, learning factors having minimum differences with the object factor Xi are found out among the learning factors {X1, X2, X3, ... Xn−1, and Xn} using the least mean square method illustrated in the following equation 6.

$$\min \sum_{k=1}^{n} (X_k - X_i)^2 \quad (6)$$

At this time, when it is determined that a value of X2 among the learning factors is most approximate to a value of Xi or coincides with the value of Xi, a corresponding weight value and a predicting function for the learning factor X2 are brought and the corresponding weight value and the object factor Xi are substituted for the corresponding predicting function so that a thickness predicted result may be calculated. After calculating the thickness predicted result using a number of object factors as input values by the above-described method, a final result may be calculated. At this time, the final predicted result as thickness data on changes in a capacity value in accordance with the number of cycles may be represented by the thickness display unit 30.

There are several forms of mechanical learning techniques. For example, "Pattern Recognition and Mechanical Learning" (written by Hyeyoung Park and Kwanyong Lee, Ihan publisher, 2011.03.05) and "Introduction to Machine Learning" (written by Alpaydin and Ethem, MitPr, 2010.02.01) disclose methods of calculating and predicting a weight value matrix by learning a relationship between input data and output data.

The thickness display unit 30 may receive predicted thickness data from the thickness predicting unit 22 and may display the received predicted thickness data on a display by a graph.

Figure 4:
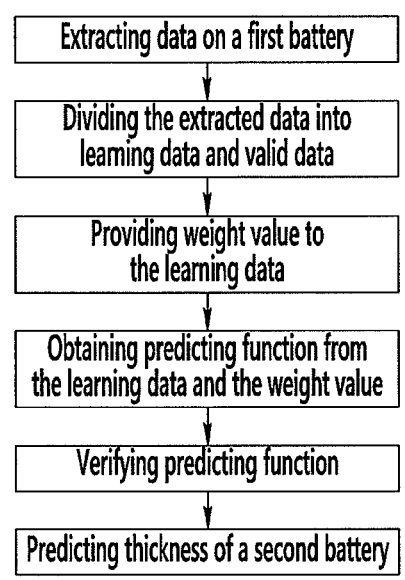
FIG. 4 is a flowchart illustrating a method of predicting a lifespan of a battery according to an embodiment.

FIG. 4 is a flowchart illustrating a method of predicting a lifespan of a battery according to an embodiment.

As shown in FIG. 4, the method of predicting the lifespan of the battery includes extracting data on a previously manufactured battery from a data base in which the data on the previously manufactured battery is stored, dividing the extracted data into learning data and valid data, providing a weight value to the learning data, and obtaining a predicting function from the learning data and the weight value, verifying the predicting function using the valid data, and predicting the thickness of a battery using data on a battery whose thickness is to be predicted, the predicting function, and the weight value.

Extracting data is performed by a data extracting unit and data on a specification of the battery whose thickness is to be predicted is extracted in consideration of the specification of the battery whose thickness is to be predicted. Obtaining a predicting function and verifying the predicting function are performed by the mechanical learning unit 21. Predicting the thickness of a battery is performed by the thickness predicting unit 22.

Hereinafter, an example in which thickness predicted are compared with results obtained by actually measuring the thickness of the battery.

Figure 5:
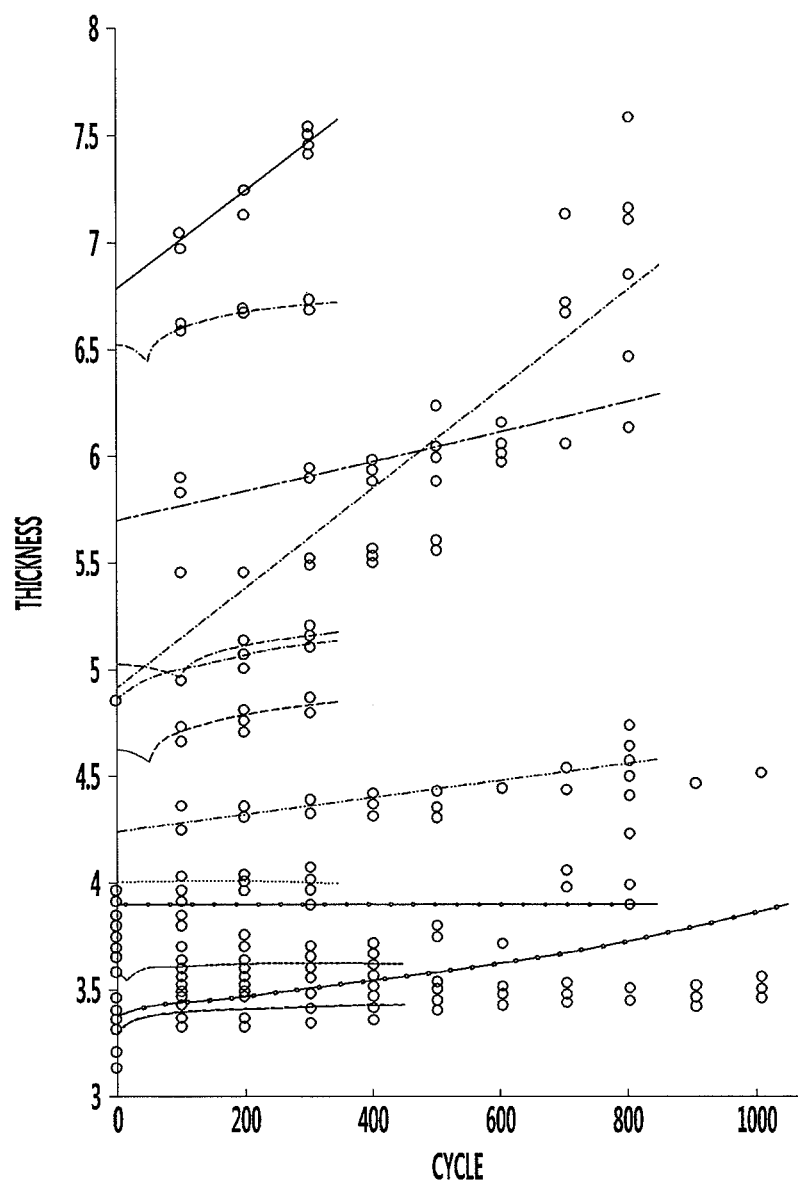
FIG. 5 is a graph illustrating data on thicknesses of a manufactured battery.

FIG. 5 is a graph illustrating data on thicknesses of a previously manufactured battery.

In FIG. 5, ○ marks represent thicknesses of cells by cycles and lines that connect the ○ marks linearly represent changes in the thicknesses of the cells based on the data on the thicknesses of the cells. The thickness of a cell to be measured is predicted using the data on the cells illustrated in FIG. 5 as the learning data.

Figure 6:
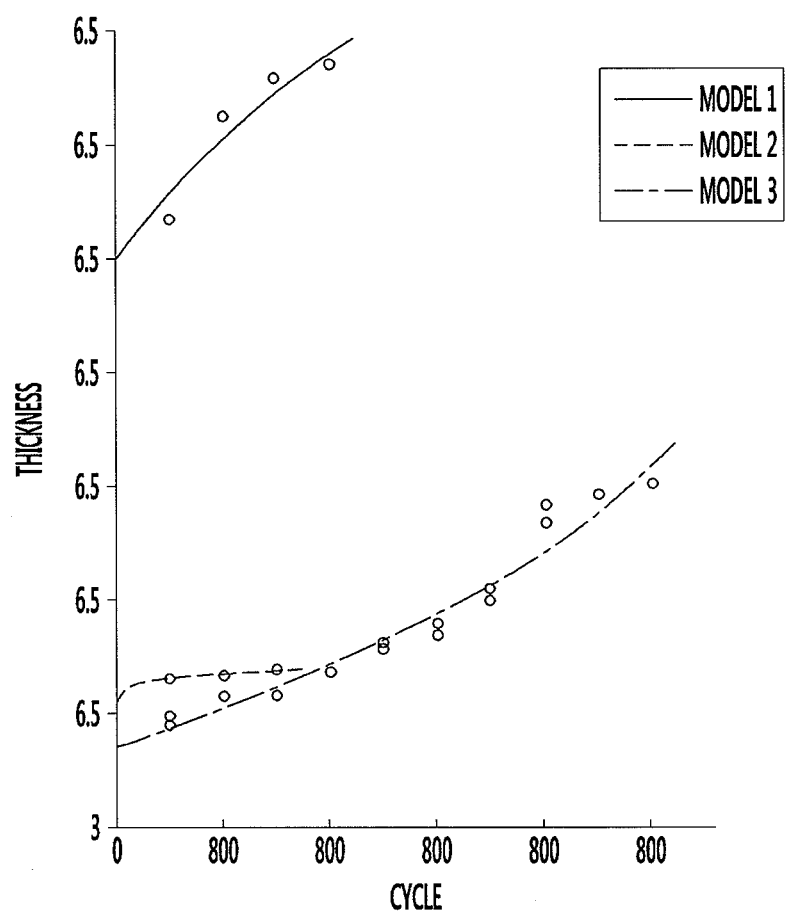
FIG. 6 is a graph illustrating a comparison between thickness predicted results obtained by battery thicknesses predicted by one exemplary embodiment and actually measured thicknesses.

FIG. 6 is a graph illustrating a comparison between thickness predicted by results obtained by a battery thickness predicting system and actually measured thicknesses.

Thicknesses of a cell to be measured are predicted using the data on the plurality of cells illustrated in FIG. 5 as the learning data.

In FIG. 6, linear graphs represent data on predicted thicknesses of cells. In FIG. 6, ○ marks represent data on thicknesses measured by actually charging and discharging a cell to be predicted. Predicted results are verified for three cells having different conditions.

As illustrated in FIG. 6, it is noted that predicted graphs of the respective cells almost coincide the actually measured thicknesses.

Algorithms disclosed below may be coded in software executed by the processors and the codes may be stored in computer readable memory.

According to at least one of the disclosed embodiments, before manufacturing a battery to evaluate the thickness of the battery, thicknesses in accordance with various characteristic factors of the battery are predicted to determine if there is a design error before manufacturing a cell. As a result, it is possible to minimize a time spent on manufacturing the cell and material cost and to reduce a time spent on evaluating the thickness of the battery.

In addition, since the thickness of the battery is predicted based on previously accumulated design characteristic data and capacity data, it is possible to reduce a time required for predicting the thickness of the battery. Since design characteristic factors including physical and chemical characteristic factors are learned as input values, it is possible to have high reliability of prediction of the thickness of the battery.

While this disclosure has been described in connection with certain exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for predicting the thickness of a battery, comprising:
    a learning data input unit configured to receive a plurality of learning factors on a first battery, wherein the first battery is a previously manufactured battery;
    an object data input unit configured to receive at least one object factor on a second battery whose thickness is to be predicted;
    a mechanical learning unit connected to the learning data input unit, wherein the mechanical learning unit is configured to obtain a predicting function based at least in part on the learning factors and to respectively provide a plurality of weight values to the learning factors; and
    a thickness predicting unit connected to the object data input unit and the mechanical learning unit, wherein the thickness predicting unit is configured to predict the thickness of the second battery based at least in part on the weight values.

2. The system of claim 1, wherein the learning data input unit is configured to obtain the learning factors based at least in part on an actual measurement of the thickness of the first battery.

3. The system of claim 1, wherein the learning factors comprise at least one of the following: learning design factors, learning process factors, and learning chemical factors.

4. The system of claim 3, wherein the learning data input unit is configured to receive at least one learning design factor, and
    wherein the learning design factor represents a design variable of the first battery.

5. The system of claim 4, wherein the learning design factor related to a design element that constitutes the first battery comprises at least one of the following: a capacity of the first battery, an energy density, a capacity ratio between a positive electrode and a negative electrode; a height to width ratio of a cell, the thickness of the cell, the width of the cell, the thickness of a separator, the width of the separator, a pore characteristic of the separator, a thermal characteristic of the separator, film uniformity of the separator, presence of coating of the separator, the number of times of winding of the separator, adherence of the separator, a kind of a negative electrode active material, a mixture density of the negative electrode, a property value of the negative electrode, the thickness of the negative electrode, a loading level of the negative electrode, a kind of a positive electrode active material, a mixture density of the positive electrode, a property value of the positive electrode, the thickness of the positive electrode, a loading level of the positive electrode, an amount of electrolyte solution, a composition ratio of the electrolyte solution, a kind of an additive, a kind of a binder, an amount of the binder, properties of a positive electrode tab and a negative electrode tab, the widths of the positive electrode tab and the negative electrode tab, the thickness of a pouch, and the thickness of an aluminum layer in the pouch.

6. The system of claim 3, wherein the learning data input unit is configured to receive at least one learning process factor, and
    wherein the learning process factor represents a process variable used for manufacturing the first battery.

7. The system of claim 6, wherein the learning process factor related to process conditions under which parts of the first battery are assembled with each other comprises at least one of the following: an initial thickness, an evaluation thickness, an evaluation temperature, presence of evaluation acceleration, a charge rate (C-Rate), a discharge rate (C-Rate), a cut off charge voltage, a cut off charge current, a cut off discharge voltage, a cut off discharge current, a charge idle time, a discharge idle time, winding tension, a degassing/folding (D/F) condition, a time, a temperature, and a tab welding method.

8. The system of claim 3, wherein the learning data input unit is configured to receive at least one learning chemical factor, and wherein the learning chemical factor represents a chemical variable of the first battery after the first battery is assembled.

9. The system of claim 8, wherein the learning chemical factor related to process conditions under which the first battery is made usable comprises at least one of the following: an aging temperature, an aging time, a degassing degree of vacuum, a degree of vacuum maintaining time, a sealing maintaining time, a thermal bonding pressure, a resealing bonding temperature, a releasing bonding time, a releasing bonding pressure, a releasing leaving temperature, a releasing leaving time, a cell pressing pressure, a cell pressing time, a pre-charging current, a pre-charging voltage, and a pre-charging time.

10. The system of claim 1, wherein the object factor comprises at least one of the following: object design factors, object process factors, and object chemical factors.

11. The system of claim 1, wherein the mechanical learning unit comprises a plurality of sub-mechanical learning units, and
wherein the thickness predicting unit comprises a plurality of sub-thickness predicting units respectively corresponding to the sub-mechanical learning units.

12. The system of claim 11, wherein each of the sub-mechanical learning units is configured to obtain a predicting function based at least in part on a corresponding learning factor and provide a weight value, and
wherein the learning factor comprises at least one of the following: learning design factors, learning process factors, and learning chemical factors.

13. The system of claim 12, wherein the sub-mechanical learning unit is configured to receive a predicting function of a neighboring sub-mechanical learning unit as an input.

14. The system of claim 12, wherein the sub-thickness predicting unit is configured to execute a predicting function based at least in part on a weight value received from a corresponding sub-mechanical learning unit.

15. A system for predicting the thickness of a battery, comprising:
a learning data receiver configured to receive at least one learning factor on a first battery;
an object data receiver configured to receive at least one object factor on a second battery whose thickness is to be predicted;
a mechanical learning unit being in data communication with the learning data receiver, wherein the mechanical learning unit is configured to obtain a predicting function based at least in part on the learning factor and to respectively provide at least one weight value to the learning factor; and
a thickness predictor being in data communication with the object data receiver and the mechanical learning unit and configured to predict the thickness of the second battery based at least in part on the weight value.

16. The system of claim 15, wherein the learning data receiver is configured to receive at least one learning design factor, and wherein the learning design factor represents a design variable of the first battery.

17. The system of claim 15, wherein the object factor comprises at least one of the following: object design factors, object process factors, and object chemical factors.

* * * * *